United States Patent
Nebolon et al.

(10) Patent No.: US 7,225,903 B2
(45) Date of Patent: Jun. 5, 2007

(54) SHOPPING CART TILT AND TIP PREVENTION DEVICE

(75) Inventors: Joseph F. Nebolon, San Diego, CA (US); Jay S. Means, Escondido, CA (US)

(73) Assignee: Carttronics, LLC, Carlsbad, CA (US)

( * ) Notice: Subject to any disclaimer, the term of this patent is extended or adjusted under 35 U.S.C. 154(b) by 157 days.

(21) Appl. No.: 11/114,815

(22) Filed: Apr. 25, 2005

(65) Prior Publication Data

US 2005/0241889 A1   Nov. 3, 2005

Related U.S. Application Data

(60) Provisional application No. 60/567,342, filed on Apr. 30, 2004.

(51) Int. Cl.
  *B62B 5/04* (2006.01)
(52) U.S. Cl. .............................. 188/19; 188/5
(58) Field of Classification Search ............ 188/5, 188/1.12, 19, 20; 16/78 R
See application file for complete search history.

(56) References Cited

U.S. PATENT DOCUMENTS

| | | |
|---|---|---|
| 488,812 A | 12/1892 | Holmes |
| 3,217,839 A | 11/1965 | Watkins et al. |
| 3,366,201 A | 1/1968 | Pesta |
| 3,608,693 A | 9/1971 | Strosberg et al. |
| 3,652,103 A | 3/1972 | Higgs |
| 3,691,590 A * | 9/1972 | Drabert .................. 16/18 R |
| 3,804,211 A * | 4/1974 | Scherzinger .............. 188/5 |
| 3,892,295 A | 7/1975 | Hahto |
| 4,199,043 A | 4/1980 | Lankester et al. |
| 4,498,688 A | 2/1985 | Walters |
| 4,503,943 A | 3/1985 | Tsukui |
| 4,524,985 A | 6/1985 | Drake |
| 5,470,085 A * | 11/1995 | Meibock et al. ........... 188/5 |
| 5,630,600 A | 5/1997 | Pasillas |
| 6,125,972 A | 10/2000 | French et al. |
| 6,173,817 B1 * | 1/2001 | Gray ..................... 188/5 |
| 6,271,755 B1 * | 8/2001 | Prather et al. .......... 188/1.12 |
| 6,293,369 B1 | 9/2001 | Bueneman |
| 6,422,580 B1 | 7/2002 | Hunter |
| 6,834,869 B1 | 12/2004 | Adams |

* cited by examiner

*Primary Examiner*—Melanie Torres
(74) *Attorney, Agent, or Firm*—Nydegger & Associates

(57) ABSTRACT

An anti-tilt device for impeding tilting or tipping of a hand-driven, wheeled vehicle has a rigid bracket for attachment to a selected wheel yoke or axle on an outer side of the wheel and a resilient brake shoe attached to a lower portion of the bracket and projecting downwardly from the bracket. The brake shoe has a lower surface for engaging the ground and providing a braking action if the vehicle is tilted or tipped. The brake shoe has a braking portion extending inwardly from the inner surface towards a wheel when the bracket is mounted on the wheel. The braking portion will engage the wheel and resist rotation of the wheel when the cart is tilted or tipped.

19 Claims, 4 Drawing Sheets

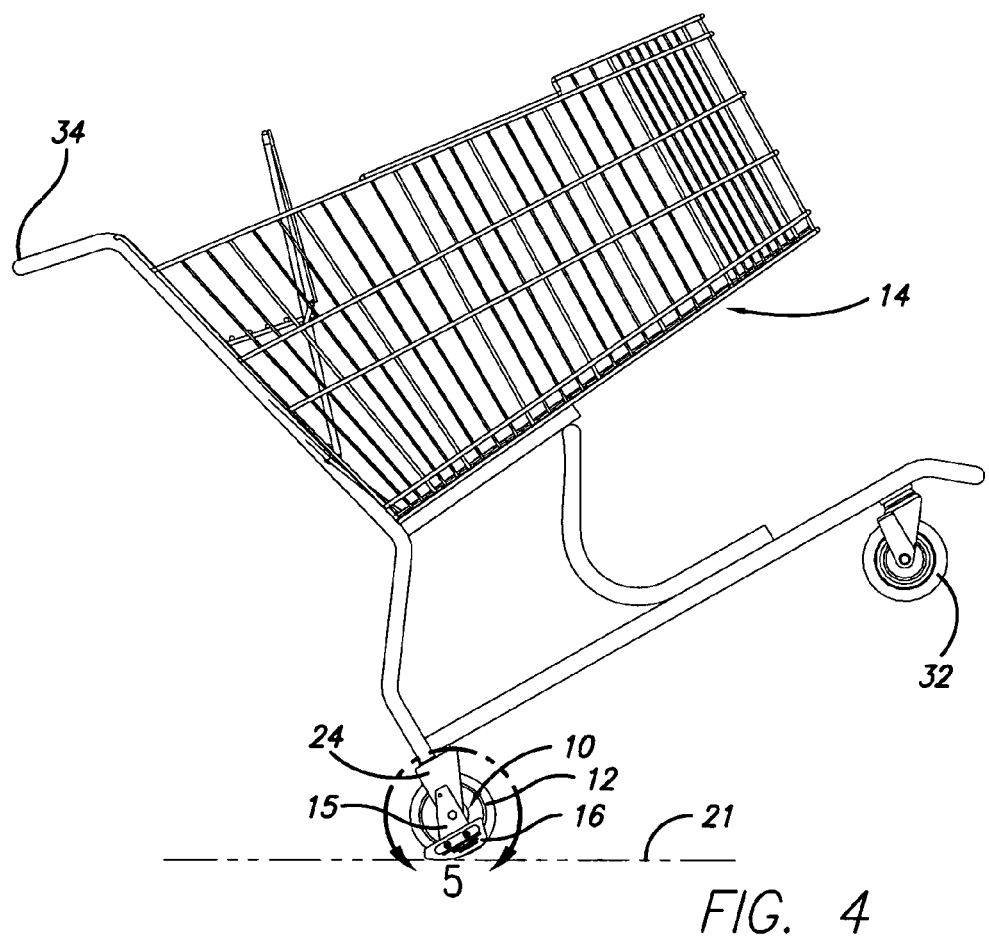
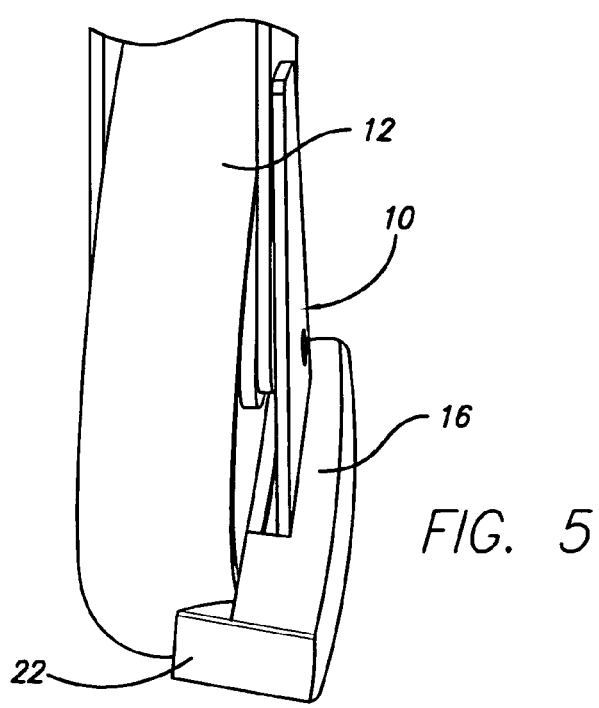
FIG. 4
FIG. 5

SHOPPING CART TILT AND TIP PREVENTION DEVICE

CROSS-REFERENCES TO RELATED APPLICATIONS

This application claims the benefit of priority of U.S. provisional application Ser. No. 60/567,342 filed Apr. 30, 2004 which is incorporated herein by reference in its entirety.

BACKGROUND OF THE INVENTION

The present invention relates generally to carts such as shopping carts and other similar devices utilizing casters or wheels which are used for temporary transportation of goods from one location to another, such as from a point of sale to a customer's car. The invention is particularly concerned with an anti-tilt or tip prevention device to limit tilting or tipping of carts or other similar wheeled devices.

Shopping carts are sometimes provided with security devices to deter shoppers and others from leaving a protected area with a cart, since theft or loss of shopping carts is a major problem for grocery stores and other types of business. Some carts are equipped with a locking device installed on one of the casters or wheels of the cart, typically at the front of the cart. The locking device is activated to lock the wheel against rotation when the cart is pushed over perimeter device. This impedes further movement of the cart since the locked wheel will drag on the ground. A security device and system of this type is described in U.S. Pat. No. 6,125,972 of French et al.

One problem with such security devices is that the locking caster or wheel can be circumvented by lifting it off the ground, thereby eliminating its deterrent effect. This can be done by tilting the cart rearwardly onto its rear wheels, thereby raising the front wheels (tilt), or by tipping the cart to one side so that it rests on one front wheel and one rear wheel (tip), with the front wheel which carries the locking device being raised from the ground.

Anti-tilt and tip devices are known but these are typically metal, U-shaped brackets which are permanently welded to the cart frame and which are designed to contact the ground when the cart is tilted or tipped. The frictional drag created by the contact of the metal bracket with the ground makes further motion of the cart difficult. However, the metal bracket will tend to damage many surfaces on which carts are generally used, such as ceramic, marble, tile, carpeting or the like. Additionally, the rigid metal bracket may cause injury to a person who inadvertently comes into contact with it, particularly since the bracket tends to develop an extremely sharp edge as a result of repeated dragging on the ground. Since the bracket is permanently attached to the cart, it is difficult to replace if it becomes worn or damaged.

SUMMARY OF THE INVENTION

It is an object of the present invention to provide a new and improved device for impeding tilting or tipping of a shopping cart or other similar wheeled vehicle.

According to one aspect of the present invention, a device for impeding tilting or tipping of a hand-driven cart or other vehicle having a pair of front wheels and a pair of rear wheels is provided, which comprises a rigid bracket for attachment to a selected wheel yoke or axle on an outer side of the wheel, and a brake shoe of non-metallic material attached to the bracket having a lower surface for engaging the ground and providing a braking action if the cart is tilted or tipped, and a braking portion for extending towards a wheel rim when the bracket is mounted on the wheel, whereby the braking portion will engage the wheel and resist rotation of the wheel when the cart is tipped to one side or tilted in a direction away from the wheel on which the device is mounted.

In the exemplary embodiment of the invention, the brake shoe is of a hard wearing, resilient material such as neoprene rubber or the like. The shoe may be releasably secured to the bracket so that it can be easily exchanged for a new brake shoe when it is too worn to be effective. The bracket may have an opening for mounting on a selected wheel axle using the wheel axle bolt, and may have an orientation tab for engaging the wheel yoke for correct positioning of the brake shoe relative to the wheel and ground.

According to another aspect of the present invention, a manually propelled wheeled vehicle is provided, which comprises a frame having a base, a pair of front wheels and a pair of rear wheels rotatably mounted on the base of the frame for engagement with a ground surface, and a braking device mounted on the frame adjacent at least one of the wheels, the braking device comprising a rigid bracket attached to the frame, and a brake shoe attached to the bracket and projecting downwardly from the bracket adjacent an outer side face of the wheel, the brake shoe having a lower surface for engaging the ground and providing a braking action if the cart is tilted or tipped, and a braking portion extending towards the wheel for engaging the wheel and resisting rotation of the wheel when the cart is tipped to one side or tilted in a direction away from the wheel on which the device is mounted.

In an exemplary embodiment of the invention, a wheel locking device is provided on one of the front wheels of the cart, the locking device being of the type which is actuated to lock the wheel if the cart is moved out of a predetermined area, such as a store parking lot. The braking device is secured to a rear wheel of the cart on the side of the cart opposite to the wheel locking device. If the cart is tilted rearwardly onto its rear wheels so as to lift the locked wheel from the ground, the brake shoe will engage the ground and the wheel so as to impede movement of the cart. Similarly, if the cart is tipped sideways towards the side opposite the locked or lockable wheel so as to lift the locked wheel from the ground, the braking device will again contact the ground to create a braking or drag action, and will simultaneously engage the wheel to create a braking action resisting rotation of the wheel. Not only does the brake shoe engage the ground for braking purposes, but it also engages the wheel so that the wheel will also not rotate and will tend to drag if an attempt is made to push the cart when tipped or tilted. This dual action will provide a substantial impediment to wheeling a cart when tilted or tipped.

The tough resilient material of the brake shoe will wear well both on abrasive ground surfaces such as asphalt or concrete and on more cosmetic or soft surfaces such as tile, rubber conveyors, carpet or the like. In addition to creating drag as a result of its own contact with the ground, the brake shoe will also deform inwardly to contact the wheel surface and create frictional drag to resist rotation of the wheel. The rubber wear part or brake shoe eliminates the risk of injury associated with metal anti-tilt brackets. In operation, whether the cart is tilted to the rear or to one side, the brake shoe will engage the ground but will also deform inwardly to engage the wheel. The brake shoe is releasably mounted on the bracket so that it can be replaced easily when worn.

BRIEF DESCRIPTION OF THE DRAWINGS

The present invention will be better understood from the following detailed description of an exemplary embodiment of the invention, taken in conjunction with the accompanying drawings in which like reference numerals refer to like parts and in which:

FIG. 4 is a side elevational view of a shopping cart with the device of FIGS. 1 to 3 installed on a rear wheel and the cart tilted rearwardly so that the brake shoe of the device engages the ground and the adjacent surface of the wheel to which it is secured;

FIG. 5 is an enlarged rear elevational view of part of the rear wheel when the cart is tilted as in FIG. 4, illustrating the braking action resulting from contact between the brake shoe and wheel;

DETAILED DESCRIPTION OF THE DRAWINGS

Figure 1:
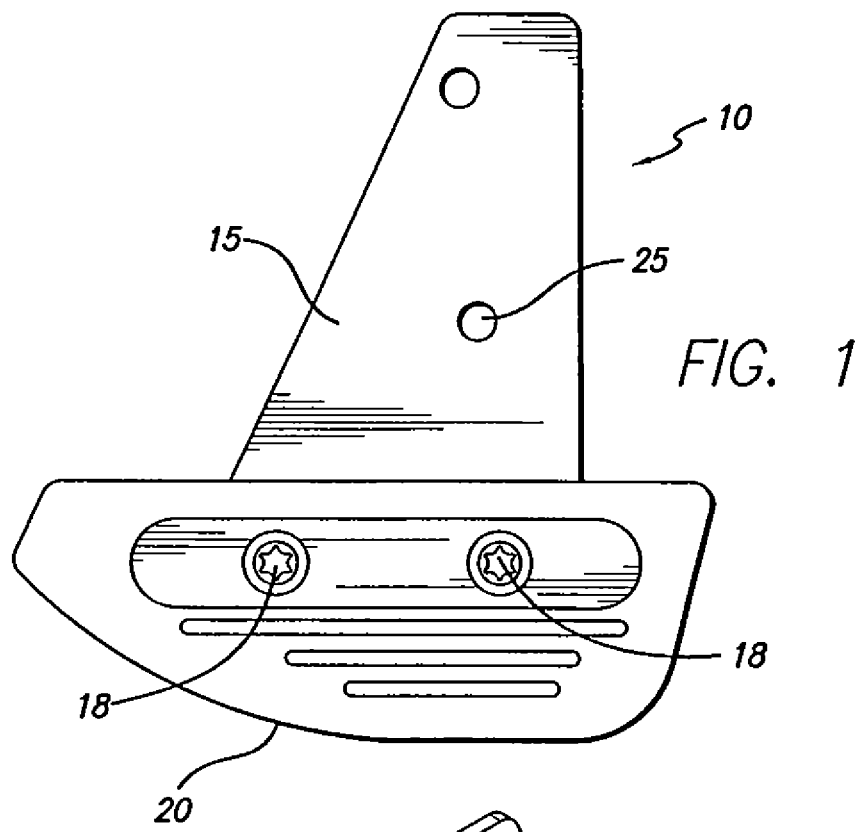
FIG. 1 is a front elevational view of an anti-tilt and tip device according to an exemplary embodiment of the invention.
Figure 2:
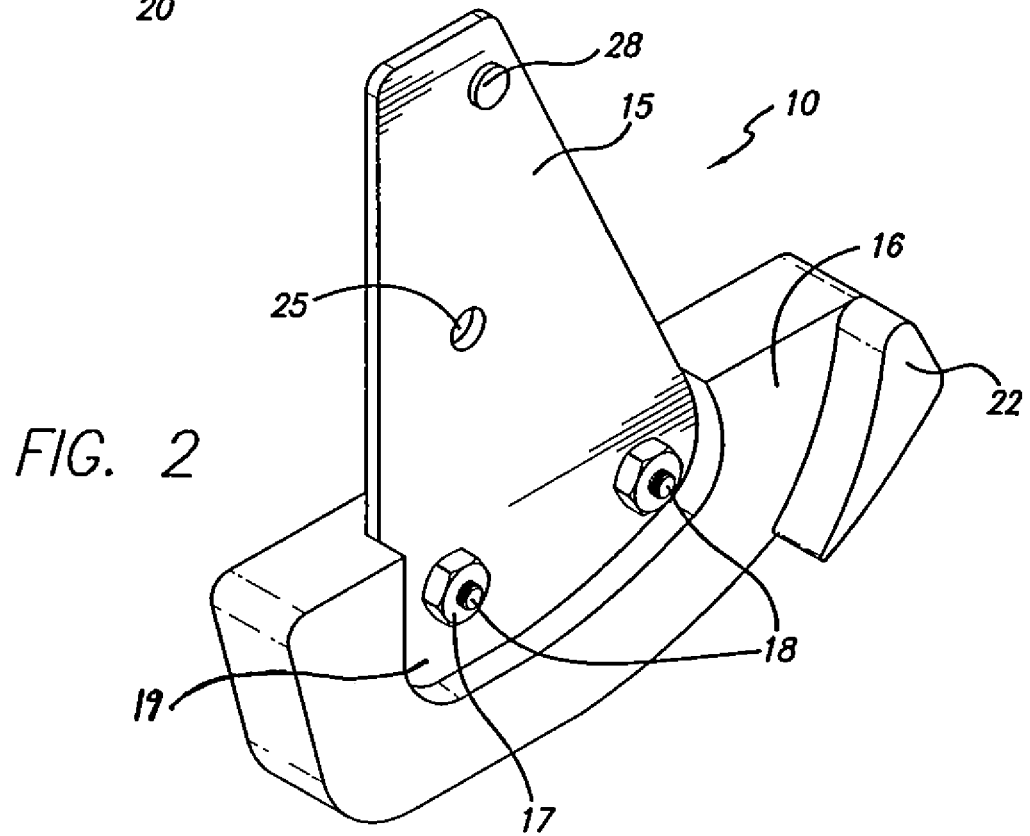
FIG. 2 is a rear perspective view of the device.
Figure 3:
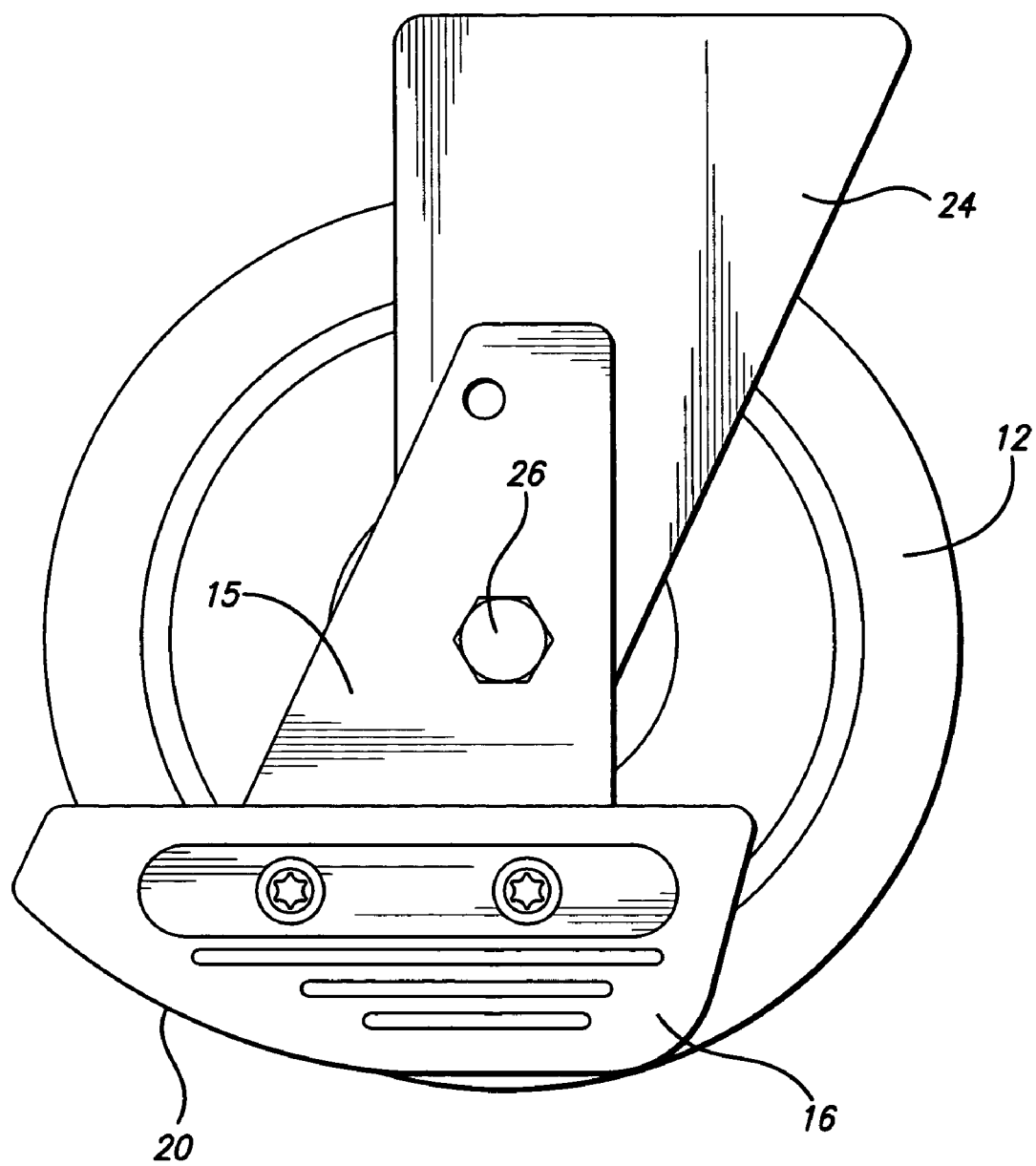
FIG. 3 is a side elevational view of the device installed on a wheel assembly.

FIGS. 1 and 2 of the drawings illustrate an anti-tilt and tip device 10 according to an exemplary embodiment of the invention, while FIG. 3 illustrates the device secured to a caster or wheel 12, and FIGS. 4 to 7 illustrate the device in use on a shopping cart 14.

The device 10 comprises a bracket 15 of metal or other rigid material and a brake shoe 16 releasably secured to a lower portion of the bracket with a pair of screws 18, which may be conventional tamper resistant screws as illustrated, which require a special tool for removal. The brake shoe projects downwardly from a lower edge of the bracket 15, which is essentially a generally flat plate. As best illustrated in FIG. 2, the rear face of the brake shoe has an indented region or recess 19 into which the lower edge of the plate or bracket 15 is seated, and the screws extend through aligned openings in the shoe and plate and enage in nuts 17 on the inner side of bracket or plate 15.

The brake shoe is of hard-wearing, resilient material for bearing against an opposing surface to create drag or a braking action. The material may be rubber or the like, with the material being selected based on the surface or surfaces on which the cart will be used. In an exemplary embodiment, the brake shoe is made of tough neoprene rubber. Very tough rubber may be used for concrete or asphalt surfaces, and softer neoprene or other rubber or rubber-like materials may be used for ceramic tile or the like.

The brake shoe has a lower braking surface 20 for engaging the ground 21 when a shopping cart is tilted or tipped, and a braking projection 22 which projects away from the bracket 15 adjacent the lower braking surface. Braking projection 22 will be directed towards a wheel rim when the device is mounted on a caster wheel 12 as in FIGS. 3 to 7. The lower surface of the brake shoe has a generally flat portion extending from a forward end of the shoe, which is designed to face the ground and be slightly raised from the ground when the device is properly installed on a shopping cart wheel. An upwardly curved portion of the lower surface extends from the flat portion to the rear end of the brake shoe, and will contact the ground if the cart is tilted rearwardly, as in FIG. 4. The braking surface may be provided with a tread for enhanced gripping and braking action.

Although the bracket 15 may be permanently secured to the yoke 24 of a shopping cart wheel or caster 12, in the exemplary embodiment it is releasably mounted on the wheel as indicated in FIG. 3. This makes replacement or removal of the anti-tilt device relatively quick and easy. The bracket has an opening 25 which is engaged by the wheel axle bolt 26 to secure the bracket to the wheel assembly with the brake shoe 16 depending downwardly across outer side face of the wheel 12. An alignment or orientation tab 28 on the inner face of the bracket provides correct positioning of the bracket relative to wheel yoke 24, by engagement with a corresponding hole in the yoke 24 (not visible in the drawings). The positioning of the bracket and brake shoe when properly aligned is such that the lower braking surface 20 is above the ground when the cart is properly positioned with all four wheels engaging the ground (see FIG. 3), and the braking projection or skid 22 is adjacent but spaced from the wheel rim.

The anti-tilt device 10 will act as a deterrent against users who attempt to remove a shopping cart from a designated area, when the cart is equipped with a security device for locking one of the wheels of the cart against rotation which is actuated when the cart leaves the designated area. Such security devices are often installed on one of the front wheels 32 of a cart, since rear wheels can be easily lifted from the ground simply by lifting up with the handle bar 34. A security locking device for a shopping cart wheel is described in U.S. Pat. No. 6,125,972 of French, the contents of which are incorporated herein by reference. If a front wheel is equipped with such a locking device, users will sometimes simply tilt the cart back onto its rear wheels 12 so that the locking caster is lifted, as indicated in FIG. 4. This enables a patron to circumvent the locking caster and remove the cart and contents from the protected area. To reduce or deter such action, the anti-tilt device of this invention can be installed on a rear wheel 12 of a cart on the side opposite to the front wheel on which the locking device is mounted.

When the anti-tilt device 10 of this invention installed on the appropriate rear wheel 12, as in FIG. 4, tilting the cart rearwardly will cause the upwardly curved portion of the lower braking surface 20 to contact the ground or surface 21 on which the cart is traveling, as can be seen in FIG. 4. At the same time, the projecting portion 22 will be deformed upwardly and pressed against the side and bottom surface of the wheel, as indicated in FIG. 5, making the wheel very difficult to rotate. The drag created by the rubbing of the braking portion 22 against the wheel surface will be independent of the surface the cart is traveling on, making the braking action effective on virtually any surface, including surfaces which are more smooth. With a braking device which only contacts the ground, the braking action may be ineffective on smooth surfaces such as vinyl, tile, or the like. This invention provides an additional braking action with the projecting portion 22 of the brake shoe bearing against the wheel surface. The braking device 10 will therefore make the cart extremely difficult to maneuver when tipped as in FIG. 4, and provides an additional deterrent against removal of carts from a protected area.

Figure 6:
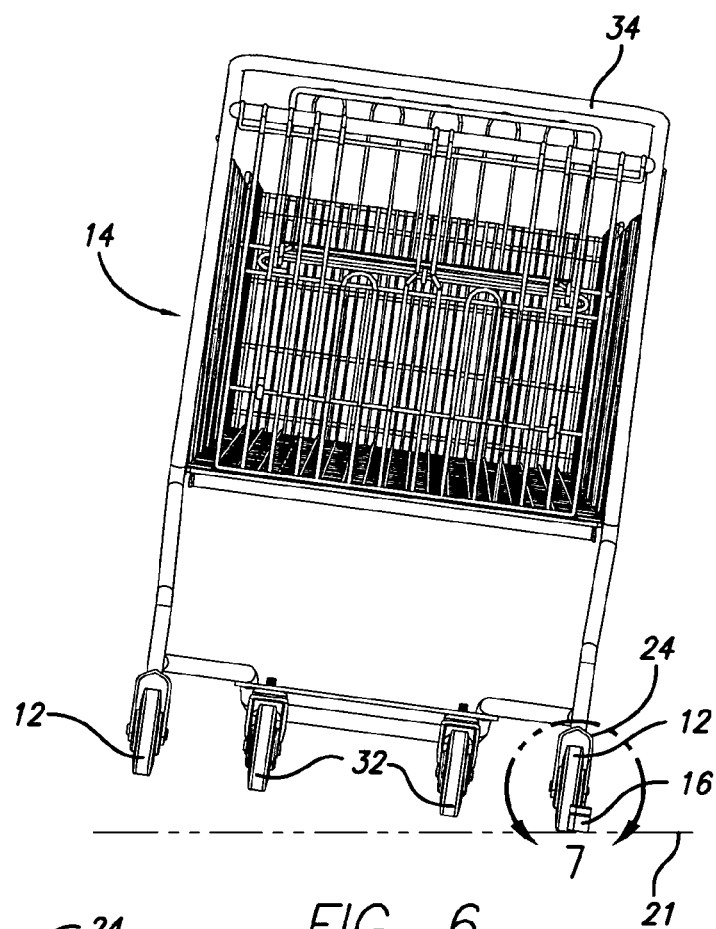
FIG. 6 is a rear view of the cart of FIG. 4 with the cart tipped to one side so that the brake shoe of the anti-tilt and tip device contacts the ground.
Figure 7:
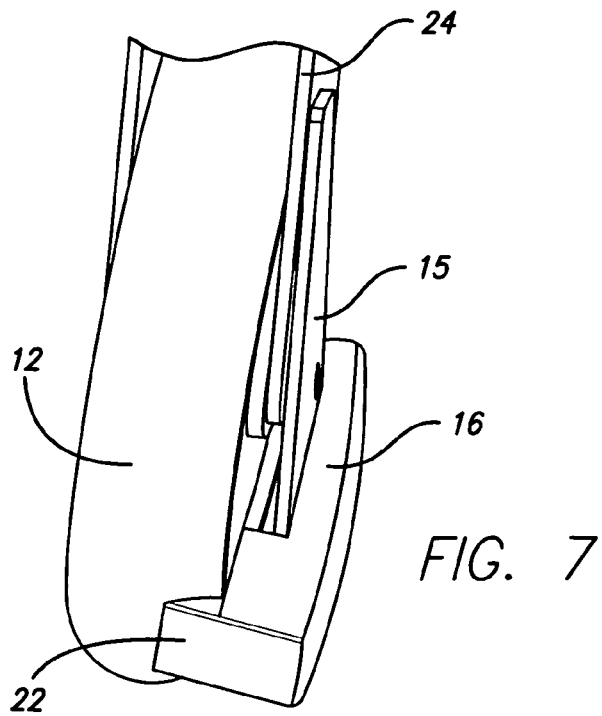
FIG. 7 is an enlarged view of the rear wheel of the cart in the position of FIG. 6, illustrating the contact between the brake shoe and the wheel.

Another way in which a patron may attempt to circumvent a locking wheel is to tip the shopping cart to one side, as indicated in FIG. 6, raising the side carrying the locking wheel from the ground. For this reason, the anti-tilt device 10 should be installed on a rear wheel of the cart on the side opposite to a locking wheel. When the cart is tipped to one side, the lower braking surface 20 of the brake shoe will again contact the ground and will drag along the ground to impede movement of the cart. At the same time, the projection 22 will be deformed inwardly and be pressed against the wheel, making the wheel very difficult to rotate. This combined action makes the cart very difficult to push and steer, again deterring attempts to remove carts.

In the case of both tip and tilt of the cart, the more extreme the tilt or tip angle, the more intense the stopping action between the rubber brake and the wheel and the more difficult the cart will be to maneuver. In this invention, drag is created both as a result of the contact of the braking device with the ground and as a result of contact with the wheel of the cart, providing increased resistance to pushing or maneuvering of the cart. At the same time, the two part design allows the rubber brake shoe to be removed and replaced when it becomes worn. The rubber or rubber-like brake shoe reduces or eliminates the risk of injury associated with fixed metal anti-tilt devices of the prior art. Assembly on a cart is convenient and easy to accomplish since no welding is required.

Although an exemplary embodiment of the invention has been described above by way of example only, it will be understood by those skilled in the field that modifications may be made to the disclosed embodiment without departing from the scope of the invention, which is defined by the appended claims.

We claim:

1. An anti-tilt device for impeding tilting or tipping of a hand-driven cart or vehicle having a pair of front wheels and a pair of rear wheels, the device comprising:
   a rigid bracket for attachment to a selected wheel yoke or axle on an outer side of a wheel, the bracket having an upper portion and a lower portion;
   a brake shoe of resilient material attached to the lower portion of the bracket and projecting downwardly from the bracket, the brake shoe having a lower surface for engaging the ground and providing a braking action if the cart is tilted or tipped, an inner surface and an outer surface; and
   the brake shoe having a braking portion extending inwardly from the inner surface towards a wheel when the bracket is mounted on the wheel, whereby the braking portion will engage the wheel and resist rotation of the wheel when the cart is tilted or tipped such that the lower surface of the brake shoe engages the ground.

2. The device as claimed in claim 1, wherein the brake shoe is of resilient material.

3. The device as claimed in claim 2, wherein the brake shoe is of neoprene rubber.

4. The device as claimed in claim 1, wherein the brake shoe is releasably secured to the bracket.

5. The device as claimed in claim 4 further comprising tamper-resistant screw fasteners releasably securing the brake shoe to the bracket.

6. The device as claimed in claim 1, wherein the inner surface of the brake shoe has a recess and the lower portion of the bracket engages in said recess.

7. The device as claimed in claim 1, wherein the bracket has an opening spaced above the brake shoe for engagement with a selected wheel axle bolt to secure the device in a fixed position relative to a wheel assembly.

8. The device as claimed in claim 7, wherein the bracket has an outer surface and an inner surface, and an orientation tab projecting inwardly from the inner surface for engaging a portion of a wheel yoke when the bracket is in a predetermined attachment position relative to the wheel yoke.

9. The device as claimed in claim 1, wherein the brake shoe has a forward end and a rear end, and the lower surface of the brake shoe has a generally flat portion for facing the ground at a location raised from the ground when the device is installed on a wheel of a cart with all four wheels of the cart contacting the ground and an upwardly curved portion extending from said flat portion to said rear end for contacting the ground if the cart is tilted rearwardly.

10. A manually propelled wheeled vehicle, comprising:
    a frame having a base;
    a pair of front wheels and a pair of rear wheels rotatably mounted on the base of the frame for engagement with a ground surface;
    at least one braking device mounted on the frame adjacent one of the wheels, the braking device comprising a rigid bracket attached to the frame, and a brake shoe of resilient material attached to the bracket and projecting downwardly from the bracket adjacent an outer side face of the wheel; and
    the brake shoe having a lower surface for engaging the ground and providing a braking action if the vehicle is tilted or tipped, and a braking portion extending towards the wheel for engaging the wheel and resisting rotation of the wheel when the vehicle is tipped to one side or tilted such that the lower surface engages the ground.

11. The vehicle as claimed in claim 10, further comprising a wheel locking device mounted on one front wheel on a first side of the vehicle, the locking device being adapted to lock the wheel if the vehicle is removed from a predetermined area, the braking device being mounted on a rear wheel of the vehicle on the opposite side to the locking device.

12. The device as claimed in claim 10, wherein the brake shoe is of resilient material.

13. The device as claimed in claim 12, wherein the brake shoe is of neoprene rubber.

14. The device as claimed in claim 10, wherein the brake shoe is releasably secured to the bracket.

15. The device as claimed in claim 10, wherein the bracket is releasably secured to the frame.

16. The device as claimed in claim 15, further comprising a wheel supporting yoke secured to the frame and a wheel axle secured to the yoke, the wheel being rotatably mounted on the axle, and the bracket being releasably secured to the wheel axle.

17. A combined vehicle caster and brake assembly, comprising:
    a wheel supporting yoke, the yoke having an inner wall and an outer wall;
    a wheel axle secured between the inner and outer walls of the yoke;
    a wheel rotatably mounted on the axle between the inner and outer walls of the yoke; and
    a braking device mounted on the outer wall of the yoke;
    the braking device comprising a rigid bracket attached to the yoke, and a brake shoe of resilient material attached to the bracket and projecting downwardly from the bracket adjacent an outer side face of the wheel; and the brake shoe having a lower surface for engaging the ground and providing a braking action if a vehicle on which the caster is mounted is tilted or tipped, and a braking portion extending towards the wheel for engaging the wheel and resisting rotation of the wheel if the vehicle is tipped or tilted.

18. The assembly as claimed in claim 17, wherein the bracket has an opening spaced above the brake shoe and the wheel axle extends through the opening to secure the bracket to the yoke in a fixed position relative to a wheel assembly.

19. The device as claimed in claim 18, wherein the bracket has an outer surface and an inner surface, and an orientation tab projects inwardly from the inner surface for engaging a portion of a wheel yoke when the bracket is in a predetermined attachment position relative to the wheel yoke.

* * * * *